United States Patent [19]
May et al.

[11] Patent Number: 5,431,241
[45] Date of Patent: Jul. 11, 1995

[54] HYBRID TRACTION CONTROL SYSTEM

[75] Inventors: Kenneth A. May, Churchville; Robert K. Holzwarth, Scottsville, both of N.Y.

[73] Assignee: Zexel-Gleason USA, Inc., Rochester, N.Y.

[21] Appl. No.: 251,617

[22] Filed: May 31, 1994

[51] Int. Cl.⁶ ............................................. B60K 28/16
[52] U.S. Cl. ........................................ 180/197; 180/370
[58] Field of Search ................ 180/197, 337, 370, 244

[56] References Cited

U.S. PATENT DOCUMENTS

| | | | |
|---|---|---|---|
| 5,37,853 | 8/1994 | Magni | 180/370 |
| 2,426,365 | 8/1947 | Matlock | 180/370 X |
| 4,667,760 | 5/1987 | Takimoto | 180/370 X |
| 4,721,176 | 1/1988 | Kabasin et al. | 180/197 |
| 4,722,411 | 2/1988 | Ohashi et al. | 180/197 |
| 4,739,856 | 4/1988 | Inagaki et al. | 180/197 |
| 4,747,461 | 5/1988 | Hayn et al. | 180/197 |
| 4,762,196 | 8/1988 | Harada et al. | 180/197 |
| 4,779,696 | 10/1988 | Harada et al. | 180/197 |
| 4,850,656 | 7/1989 | Ise et al. | 303/100 |
| 4,866,618 | 9/1989 | Tamura et al. | 364/431.03 |
| 4,866,623 | 9/1989 | Ise et al. | 364/424.03 |
| 4,873,639 | 10/1989 | Sato et al. | 364/426.02 |
| 4,884,651 | 12/1989 | Harada et al. | 180/197 |
| 4,917,208 | 4/1990 | Komoda | 180/197 |
| 4,939,656 | 7/1990 | Hoashi et al. | 364/426.02 |
| 5,119,915 | 6/1992 | Nelson | 192/106.1 |
| 5,255,193 | 10/1993 | Katayose et al. | 364/426.02 |
| 5,265,693 | 11/1993 | Rees et al. | 180/197 |
| 5,303,794 | 4/1994 | Hrovat et al. | 180/197 |

FOREIGN PATENT DOCUMENTS 6054517 2/1994 Japan .

Primary Examiner—Margaret A. Focarino
Assistant Examiner—Kevin Hurley
Attorney, Agent, or Firm—Eugene Stephens & Associates

[57] ABSTRACT

A traction control system combines engine output power limiting with a single point brake for controlling wheel slip. The brake is preferably connected to the engine to reduce torque requirements and avoid drive line shock. One friction member of the preferred brake is coupled to the engine block, and another friction member member is coupled together with a drive pulley to the engine output shaft. An electromagnetic actuator moves the two friction members into engagement with each other within a hollow interior of the drive pulley.

28 Claims, 9 Drawing Sheets

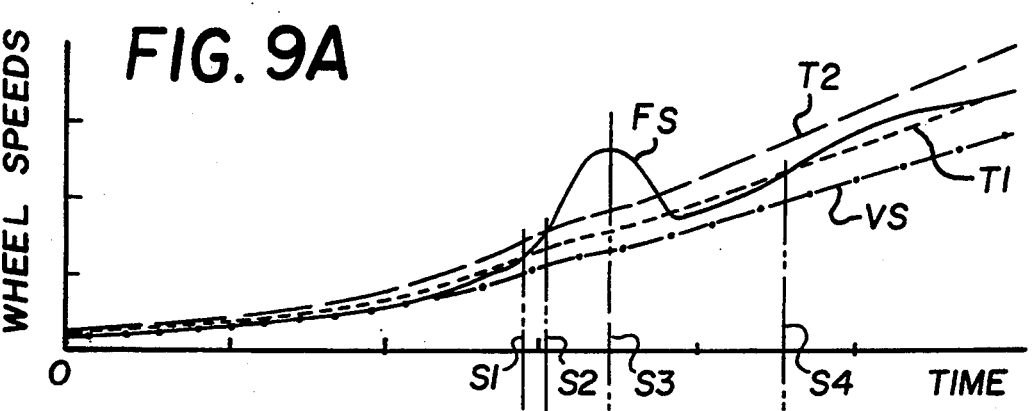
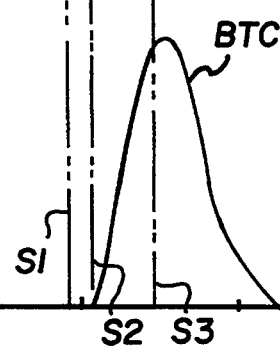

HYBRID TRACTION CONTROL SYSTEM

TECHNICAL FIELD

The invention relates to traction control systems for motor vehicles including systems that provide more than one type of response to a loss of motive traction.

BACKGROUND

Traction control systems of motor vehicles limit wheel slipping in which a drive wheel overruns its traction surface. Slipping occurs when more torque is imparted to a drive wheel than can be withstood by its traction surface for correspondingly moving the vehicle. The excess torque causes a sudden increase in drive wheel rotational speed with respect to its traction surface, referred to herein as wheel slipping.

Traction measured as a force is a function of wheel slip measured as a percentage of overall drive wheel rotation that is in excess of rolling contact with the traction surface. A small percentage of wheel slip is needed to fully exploit the available traction force, but larger percentages of wheel slip reduce the traction force. Accordingly, wheel slipping, i.e., large percentages of wheel slip, actually reduces the amount of power that can be used to move a vehicle. Excess wheel slip also reduces lateral stability.

Many traction control systems have evolved as extensions of anti-lock braking systems. However, instead of reducing brake pressures in response to wheel skidding, the traction control systems increase brake pressures in response to excessive wheel slip. The same sensors can be used by both systems to monitor rotational speeds of the wheels.

However, the use of individual drive wheel brakes for traction control has many disadvantages. For example, the application of individual drive wheel brakes can produce shocks in the drive line or reflect excess torque between paired drive wheels resulting in drive line instabilities known as "hunting". Excessive use of the brakes causes accelerated wear. Engine output power can often overwhelm the power-absorbing capacities of the wheel brakes. Also, the application of the wheel brakes requires the generation of fluid pressure and its controlled conversion into mechanical braking torques, which can delay appropriate braking responses.

Other traction control systems regulate engine output power to limit wheel slip. The engine output power of internal combustion engines is controlled by regulating ignition, air intake, fuel intake, or exhaust. Engine controllers already regulate some or all of these functions, so little additional hardware is required for traction control. However, throttle controls appear to be preferred for directly overriding operator commands to the engine.

Although most engine output controls, including throttle controls, have nearly unlimited capacity for reducing output power to the drive wheels, the response to excessive wheel slip is slow. For example, significant wheel slipping and associated further loss of traction can occur before output power can be sufficiently reduced to regain traction. Overcompensation for wheel slip can also limit vehicle acceleration, uphill speeds, and towing capacity, which detract from potential vehicle performance.

Some hybrid traction control systems combine engine output power controls with drive wheel brake controls for limiting wheel slipping. However, the combination does not necessarily mitigate the drawbacks of using engine output power controls or wheel brake controls separately. For example, primary use of the wheel brakes can still cause drive line shocks and accelerated wear, whereas primary use of the engine output power controls is still too slow to prevent excessive wheel slip.

SUMMARY OF INVENTION

Our invention relates to a hybrid traction system that combines power train braking with engine output power reductions to limit wheel slip. However, instead of using individual drive wheel brakes to perform the braking function, a single point brake is positioned along the power train to regulate transmissions of output power to the drive wheels. The single point brake operates with a mechanical advantage over the wheel brakes for limiting transmissions of engine power to the drive wheels. Smaller torques accompanying use of the single point brake are expected to reduce drive line shock.

Conventional power trains originate at an internal combustion engine that generates output power and extends in two directions. In one of the directions, the power trains transmit a portion of the engine power to auxiliary devices such as alternators, compressors, and pumps. In the other direction, the power trains transmit the remaining engine power along the drive line through a differential that apportions the remaining torque between the drive wheels. The single point brake can be positioned along the power train between the auxiliary devices and the differential to regulate the transmission of output power to the drive wheels collectively.

Our single point brake is preferably connected adjacent to the engine. However, instead of locating the single point brake along the drive line between the engine and the differential, we prefer to locate the single point brake between the engine and the auxiliary devices. Within this section of the power train, the engine includes a block and an output shaft, i.e., a crank shaft, that is rotatably mounted within the block. A drive pulley is coupled to the output shaft for transmitting the output power to the auxiliary devices.

Our preferred single point brake includes two relatively movable members (e.g., a stator and a rotor). A first of the members can be coupled to the engine block, and a second of the members can be coupled to the output shaft or pulley. Both members are preferably housed within a hollow interior of the pulley. This location is readily available on most automobiles and can have a twelve-to-one or higher mechanical advantage for braking the engine over wheel brakes that operate through speed ratio changes in both a transmission and a final drive of the drive line.

An actuator can be used to control relative movement between the two members for generating a braking force on the engine output shaft. For example, the first member can incorporate an electromagnetic coil, and the second member can incorporate an armature that is attracted by the coil. A leaf spring having a high magnetic reluctance can be used to couple the second member to the pulley in a position out of engagement with the first member. When energized, the coil overcomes a restoring force of the leaf spring and draws the two members into engagement.

The generation of engine output power is preferably regulated by a subthrottle control. The subthrottle is located along an air intake line shared by a main throttle that is controlled by a vehicle operator. A drive motor controls the position of the subthrottle. Normally, the subthrottle is open at least to the extent of the main throttle. However, the subthrottle can be closed more than the main throttle to further restrict the intake of air and thereby reduce the generation of engine output power.

The single point brake and the engine output regulator are preferably controlled by an electronic system that detects wheel slip and executes control logic for determining appropriate responses. Shut-down logic is also provided to deactivate the system or to prevent the single point brake from overheating.

DRAWINGS

FIGS. 9A-9C are graphs representing the performance of the traction system using different thresholds for engaging the subthrottle and the brake.

DETAILED DESCRIPTION

Figure 1:
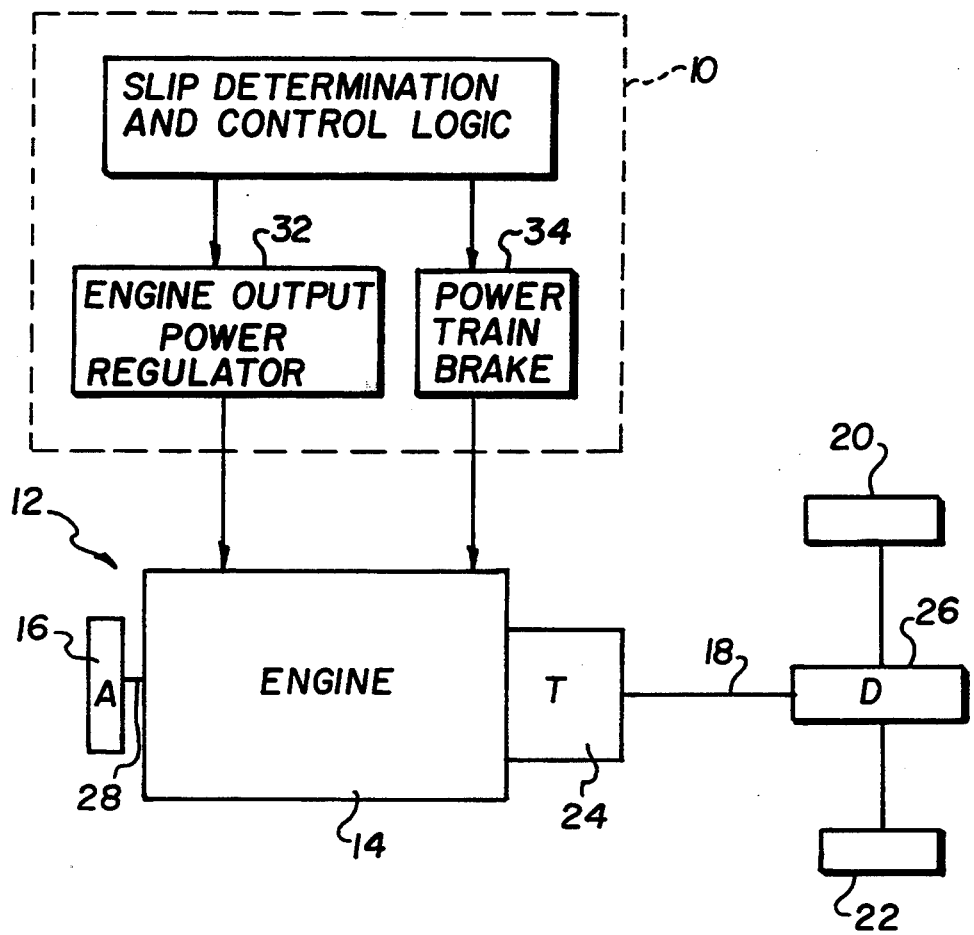
FIG. 1 Is a block diagram of our basic traction system.

Our new hybrid traction control system 10 is referenced in FIG. 1 with respect to a power train 12 of a motor vehicle. The power train 12 originates with an internal combustion engine 14 that generates output power and extends in one direction to auxiliary devices 16 that receive a portion of the output power and in another direction along a drive line 18 to a pair of drive wheels 20 and 22 that receive a remaining portion of the output power.

The drive line 18 includes a transmission 24 and a differential 26. The transmission 24, along with the auxiliary devices 16, receives engine output power from an engine output shaft 28, also referred to as a crankshaft, and transmits the output power at selectable speed ratios. The differential 26, which is associated with a fixed ratio final drive, apportions the output power between the two drive wheels 20 and 22. The speed ratio changes across the transmission 24 and the differential 26 reduce the average rotational speed of the drive wheels 20 and 22 with respect to the rotational speed of the output shaft 28 and increase the total torque of the two drive wheels with respect to the torque of the output shaft 28.

The hybrid traction control system 10 includes slip determination and control logic 30 for operating an engine output power regulator 32 and a power train brake 34. The slip determination and control logic 30 provides for detecting drive wheel slip and for producing commands to the output power regulator 32 and the power train brake 34 for limiting wheel slip. Many hybrid traction control systems that combine engine output power control with drive wheel brake controls include substantially suitable slip determination and control logic. However, instead of controlling multiple wheel brakes, the slip determination and control logic 30 is only required to operate a single power train brake 34. Examples of such systems include U.S. Pat. No. 4,739,856 to Inagaki et al.; U.S. Pat. No. 4,762,196 to Harada et al.; U.S. Pat. No. 4,866,623 to Ise et al.; and U.S. Pat. No. 4,939,656 to Hoashi et al. All of these exemplary patents are hereby incorporated by reference.

The engine output power regulator 32 is also a commonplace feature of hybrid traction control systems. Although a subthrottle control is preferred, other engine power regulators that control engine operations such as ignition, fuel intake, or exhaust could also be used. Examples of such alternative regulators include U.S. Pat. No. 4,721,176 to Kabasin et al. and U.S. Pat. No. 5,265,693 to Rees et al. Also, a device for overriding an accelerator pedal is disclosed in U.S. Pat. No. 4,747,461 to Hayn et al. The patents containing these additional examples of engine output power regulators are also hereby incorporated by reference.

The power train brake 34 can be a single point brake located along the power train 12 between the auxiliary devices 16 and the differential 26. Although the power train 12 is depicted as a rear wheel drive, the power train brake 34 could also be located similarly in a front wheel drive power train or in an all wheel drive power train having a center differential that apportions power to front and rear drive axles. Thus, the brake 34 is located along the power train 12 from the engine 14 before the power train is split into separate drives to the drive wheels 20 and 22.

Preferably, the power train brake 34 is located between the auxiliary devices 16 and the transmission 24 and within a portion of the power train that rotates at the same speed as the engine output shaft 28. This reduces torque requirements of the power train brake 34 over torque requirements at other locations in the power train 12. As a result, the power train brake 34 can be sized smaller than drive wheel brakes that are required to impart much greater torques. The reduced torques are intended to lower drive line stresses and to avoid the drive line shocks associated with wheel brakes, and the location of the power train brake 34 adjacent to the engine 14 is intended to avoid drive line windups between wheel brakes and the engine that can cause instabilities.

Although the power train brake 34 is preferably an electromagnetically actuated friction brake, other forms of brakes could also be used including hydraulic or pneumatic brakes, eddy current retarders, and electrorheological or electro-rheological magnetic fluid shearing devices. The electromagnetic friction brake is preferred for its accuracy, simple design, small size, low cost, and fast response time. One example is disclosed in U.S. Pat. No. 5,119,915 to Nelson, and this patent is also incorporated by reference.

The differential 26 is preferably a so-called "limited slip" or torque-proportioning differential that supports frictional resistance to relative rotation between the drive wheels 20 and 22. This limits relative slipping between the drive wheels 20 and 22 associated with uneven amounts of traction and permits the hybrid traction control system 10 to match transmissions of power more closely to the total amount of traction that is available to both of the drive wheels 20 and 22. The "hunting" instability between drive wheels associated with use of individual wheel brakes is thus eliminated.

Figure 2:
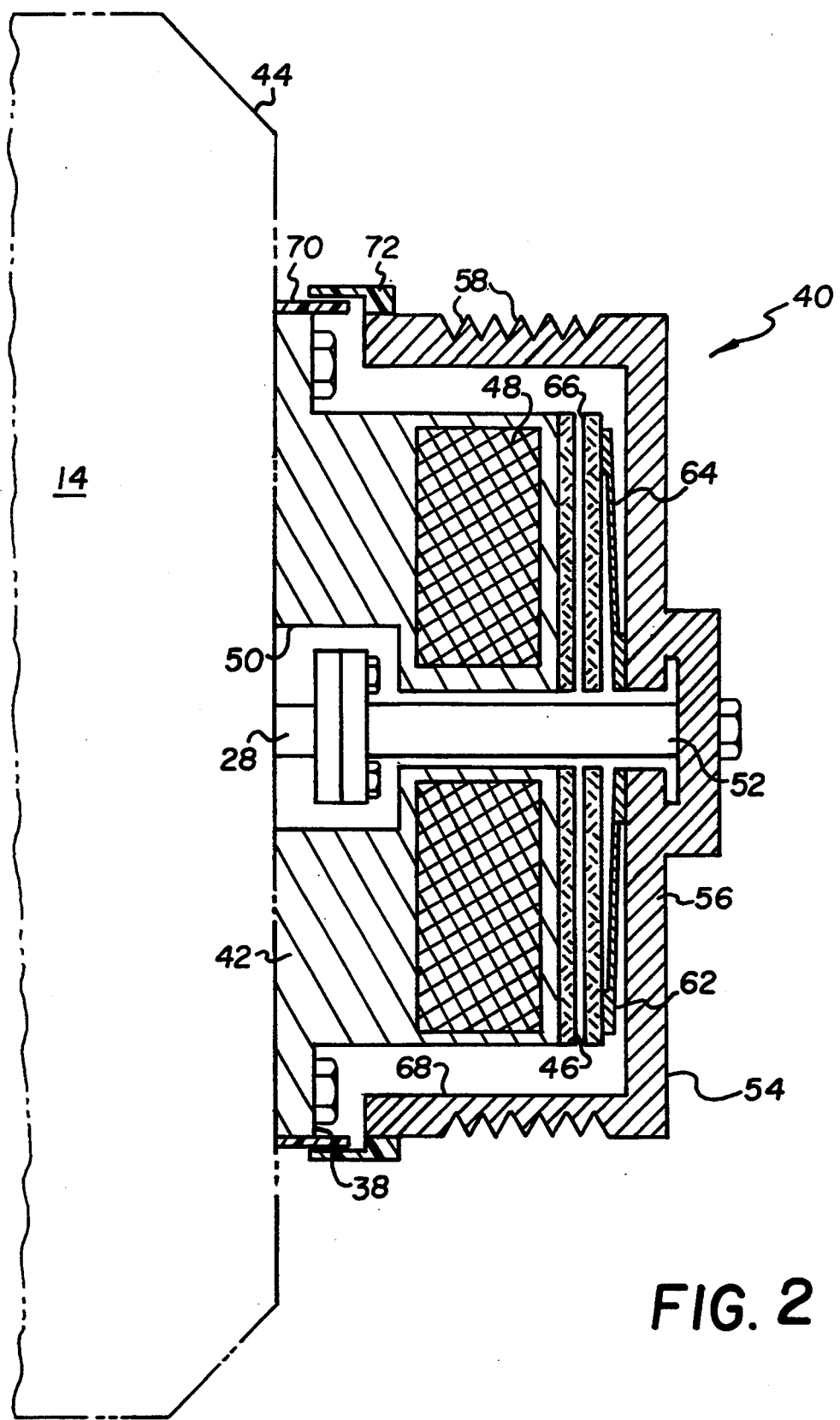
FIG. 2 is a cross-sectional view of our preferred single point brake.

FIG. 2 is a cross-sectional view of our preferred electromagnetic brake 40 located between the engine 14 and auxiliary devices 16. A fixed member 42 of the brake 40 has one end with a flange 38 that is attached to a block 44 of the engine 14 and another end that is covered by a durable friction surface 46. Within the fixed member 42 is an electrical coil 48 that can be energized for creating variable strength magnetic fields.

The output shaft 28 of the engine extends at least part way through a central opening 50 in the fixed member 42. However, instead of coupling the usual drive pulley directly to the output shaft 28 for transmitting power to the auxiliary devices 16, an extension shaft 52 is connected to the output shaft 28 for coupling a special cup-shaped drive pulley 54. One end of the drive pulley 54 is open and the other end is closed by a hub 56 that is connected to the extension shaft 52. Conventional grooves 58 are formed in a peripheral surface of the drive pulley 54 for aligning drive belts (not shown) with driven pulleys (also not shown) of the auxiliary devices 16.

A movable member 62 of the brake 40 has one end attached to the hub 56 of the drive pulley by a leaf spring 64 and another end covered by a durable friction surface 66 that is aligned with the friction surface 46 of the fixed member 42. The spring 64 couples the movable member 62 for rotation with the output shaft 28 but permits translation of the movable member 62 along the output shaft 28 with respect to the fixed member 42.

Normally, the spring 64 biases the friction surface 66 of the movable member out of engagement with the friction surface 46 of the fixed member. However, the movable member 62 also functions as an armature that is attracted to the fixed member 42 by energization of the coil 48. Electrical current within the coil 48 can be varied or modulated for engaging the friction surface 66 with the friction surface 46 to produce varying amounts of frictional resistance to rotation of the output shaft 28 with respect to the block 44.

The drive pulley 54 is formed with a hollow interior 68 for enclosing the fixed and movable members 42 and 62 of the brake 40. This arrangement saves space and protects the friction surfaces 46 and 66, as well as the magnetic components of the friction brake 40, from contamination. Overlapping seals 70 and 72, which are respectively attached to the open end of the drive pulley 54 and the flange 38 of the fixed member, provide further protection from contamination.

The attachment of the fixed member 42 of the brake directly on the engine block 44 permits the block 44 to be used as a heat sink for the friction brake 40. Accordingly, the brake 40 can be maintained at a more even temperature corresponding to the temperature of the engine block 44. Rotation of the drive pulley 54 could be used to circulate filtered air through the brake 40 to more quickly dissipate concentrations of heat. Also, the brake 40 could be periodically engaged to remove contaminants from the friction surfaces 46 and 66.

A variety of other brake structures could be substituted for the electromagnetic brake 40 within the hollow interior 68 of the drive pulley 54. For example, one member could be relatively rotated and the other member relatively translated. More than two such members could be combined to form a compound brake. On the other hand, one of the members could be formed by the hollow interior 68 of the drive pulley as the rotating member of a drum brake. A disk brake could also be used, as well as other forms of actuation such as electric drives or hydraulic cylinders.

Figure 3:
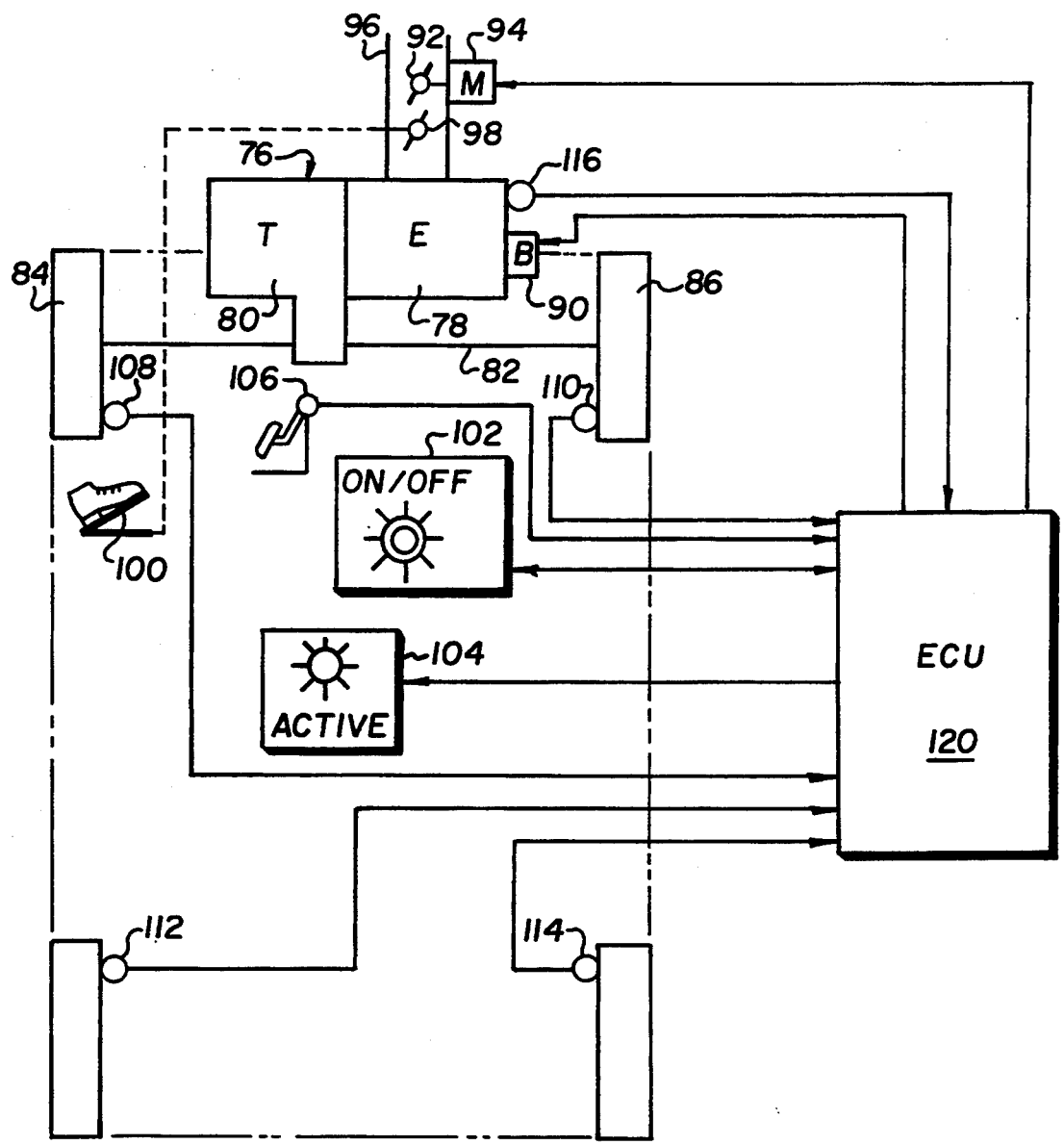
FIG. 3 is schematic diagram of the traction system applied to a front wheel drive vehicle.

A front wheel drive application of our new hybrid traction system is shown in the remaining drawing figures. With initial reference to FIG. 3, a power train 76 is depicted including engine 78, a transmission 80, a front axle 82, and two front drive wheels 84 and 86. The transmission 80, as illustrated, incorporates a differential that apportions torque between the two front drive wheels 84 and 86.

A single point brake 90 is connected to the engine 78, between the engine output shaft and the engine block as shown in FIG. 2. A subthrottle 92 that is movable by an actuator 94 is positioned in series within a common air intake line 96 with a throttle 98 that is movable by an accelerator pedal 100 within the vehicle cab (not shown). Preferably, the actuator 94 is a stepper motor that can be rotated by predetermined amounts to accurately regulate air flows through the intake line 96.

Also within the cab are a traction control override switch 102, a traction control active light 104, and a brake pedal switch 106. Each wheel has a rotational speed sensor, namely, front left wheel sensor 108, front right speed sensor 110, rear left wheel sensor 112, and rear right speed sensor 114. Engine speed is monitored by speed sensor 116.

Figure 4:
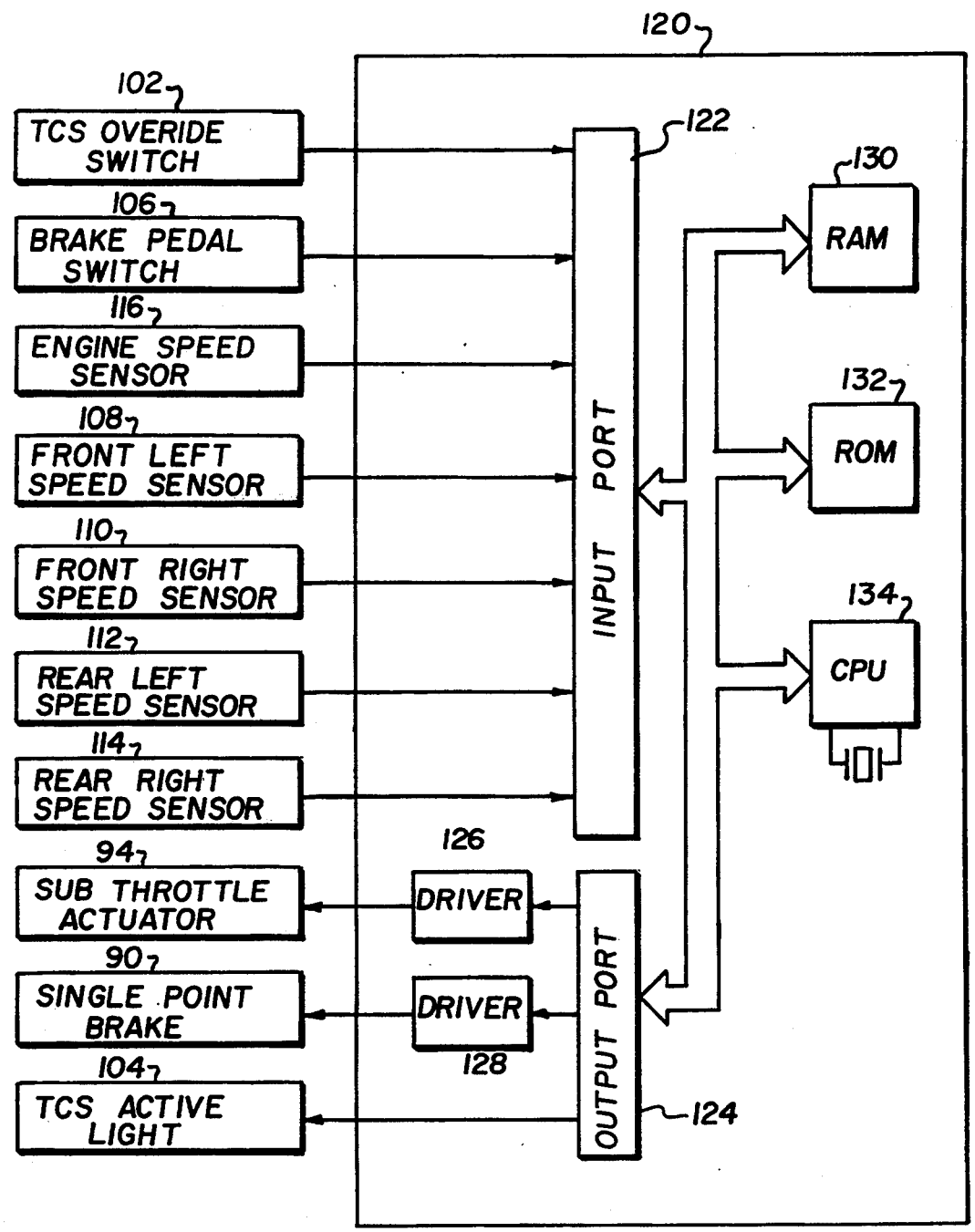
FIG. 4 is a block diagram of inputs to and outputs from an electronic control unit.

An electronic control unit 120, shown in more detail within FIG. 4, has input and output ports 122 and 124. The input port 122 receives signals from the traction control override switch 102, the brake pedal switch 106, the engine speed sensor 116, and all four wheel speed sensors 108, 110, 112, and 114. The output port 124 sends signals indirectly to the subthrottle actuator 94 and the single point brake 90 through respective drivers 126 and 128 and directly to the traction control active light 104. Also within the electronic control unit 120 is a conventional organization of random access memory 130, read only memory 132, and a central processing unit 134.

Figure 5:
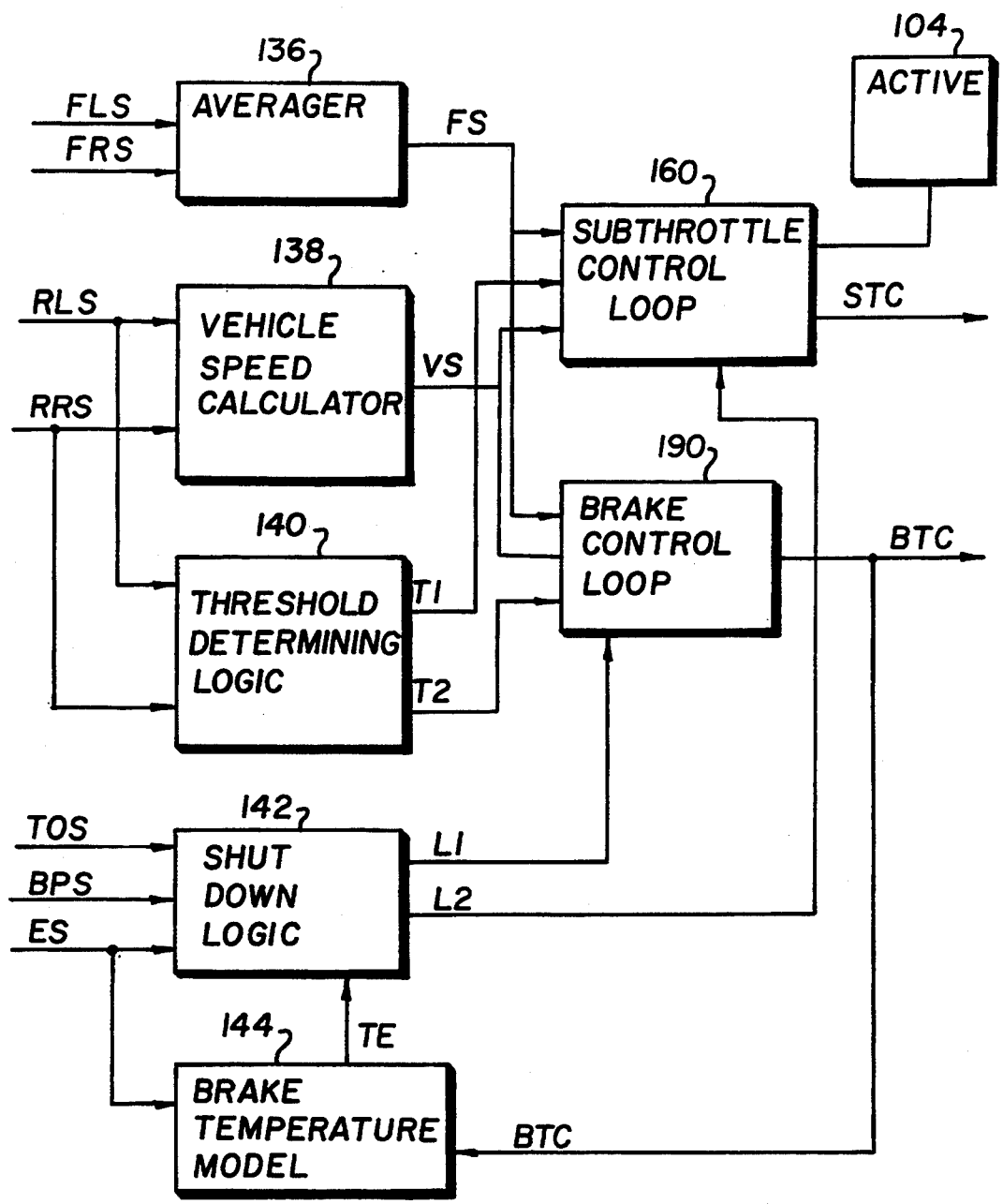
FIG. 5 is a block diagram of functions performed by the electronic control unit.

FIG. 5 shows the overall logic employed within the electronic control unit for detecting wheel slip and for controlling the subthrottle actuator 94 and brake 90. An averager 136 receives signals "FLS" and "FRS" from the left and right front wheel sensors 108 and 110 and outputs a signal "FS" that corresponds to an average speed of the two front drive wheels 84 and 86. A vehicle speed calculator 138 receives signals "RLS" and "RRS" from the left and right rear wheel sensors 112 and 114 and outputs a signal "VS" that corresponds to a speed of the vehicle.

The signals "RLS" and "RRS" are also received by threshold determining logic 140 that outputs signals "T1" and "T2" in terms of multiples of vehicle speed above which a traction control response is required. The thresholds "T1" and "T2" can be varied in response to changing operating conditions estimated from the wheel speed signals "RLS" and "RRS". For example, U.S. Pat. No. 4,884,651 to Harada et al., which is hereby incorporated by reference, teaches how target slip values can be varied with longitudinal acceleration.

The thresholds "T1" and "T2" are also preferably varied (i.e., reduced) as functions of lateral acceleration, sacrificing some tractive effort for increased lateral stability. Lateral acceleration can either be estimated from the wheel speed signals "RLS" and "RRS" or a separate acceleration sensor could be used. Thus, the thresholds can be increased with increasing longitudinal acceleration but decreased with increasing lateral acceleration. Look-up tables can be used for determining the thresholds "T1" and "T2" for given values of lateral and longitudinal acceleration.

Shut-down logic 142 receives signals "TOS" and "BPS" indicating the respective states of the traction control override switch 102 and the brake pedal switch 106, a signal "ES" from the engine speed sensor 116, and a signal "TE" from a brake temperature model 144. The brake temperature "TE" is calculated according to a conventional algorithm from the signal "ES" that also represents brake speed and a signal "BTC" that represents brake torque. Output from the shut-down logic are two signals "L1" and "L2" that enable or disable the subthrottle actuator 94 or the single point brake 90.

Figure 6:
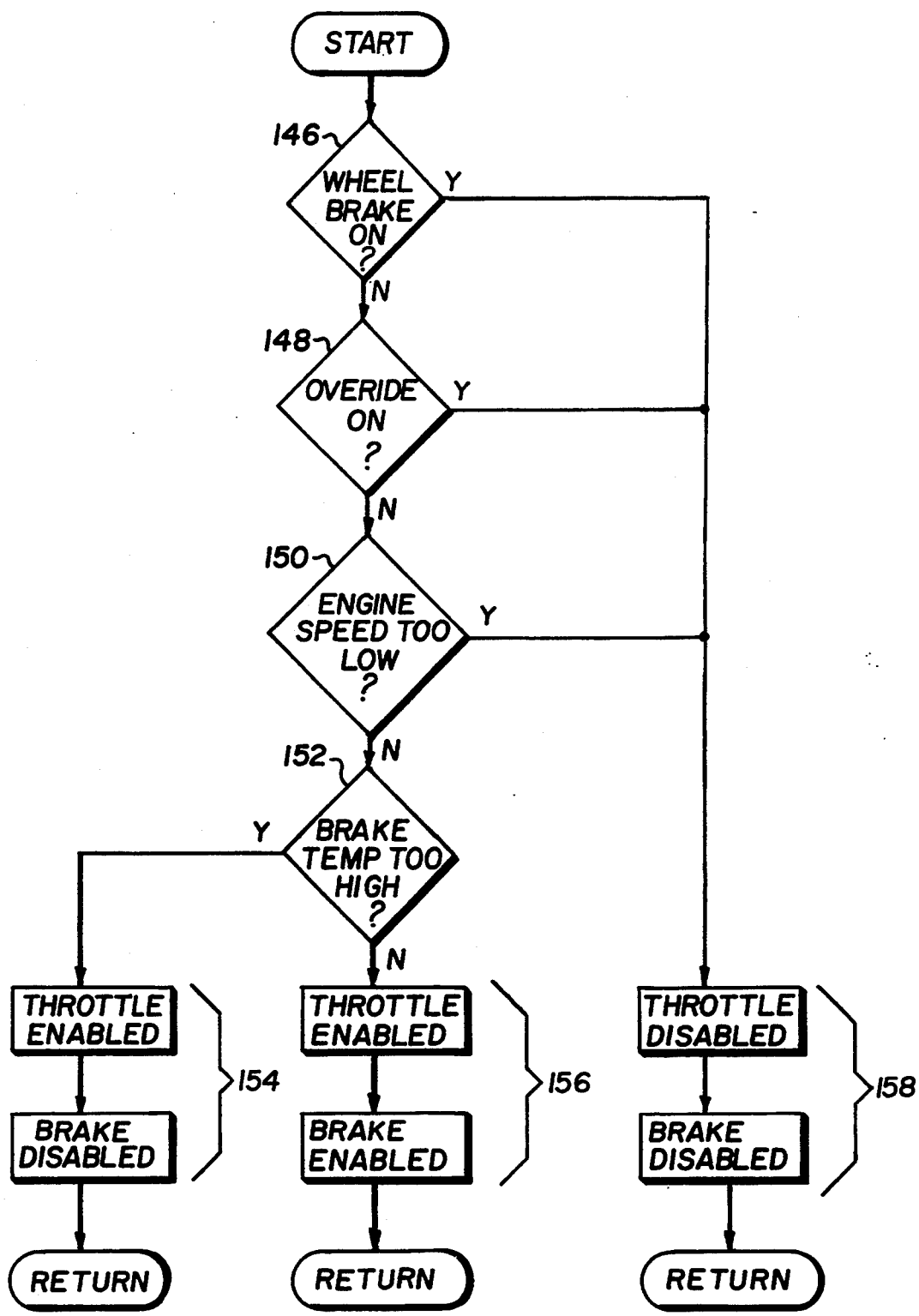
FIG. 6 Is a flow chart of a shut-down function.

In FIG. 6, a flow chart illustrates four series decision steps 146, 148, 150, and 152 that are used to decide between three sets of responses 154, 156, and 158. The first three decisions 146, 148, and 150 check respectively if the brake pedal switch is on, if the traction control override switch is on, and if the engine speed is too low. An affirmative answer to any one of these questions selects the response 158 which disables both the subthrottle actuator 94 and the single point brake 90. The fourth decision 152, which checks if the brake temperature is too high, decides between two remaining responses 154 and 156. If the brake temperature is too high, then the response 154 is selected which enables the subthrottle actuator 94 but disables the brake 90. If the brake temperature is within an acceptable limit, then the response 156 is selected which enables both the subthrottle actuator 94 and the single point brake 90.

Figure 7:
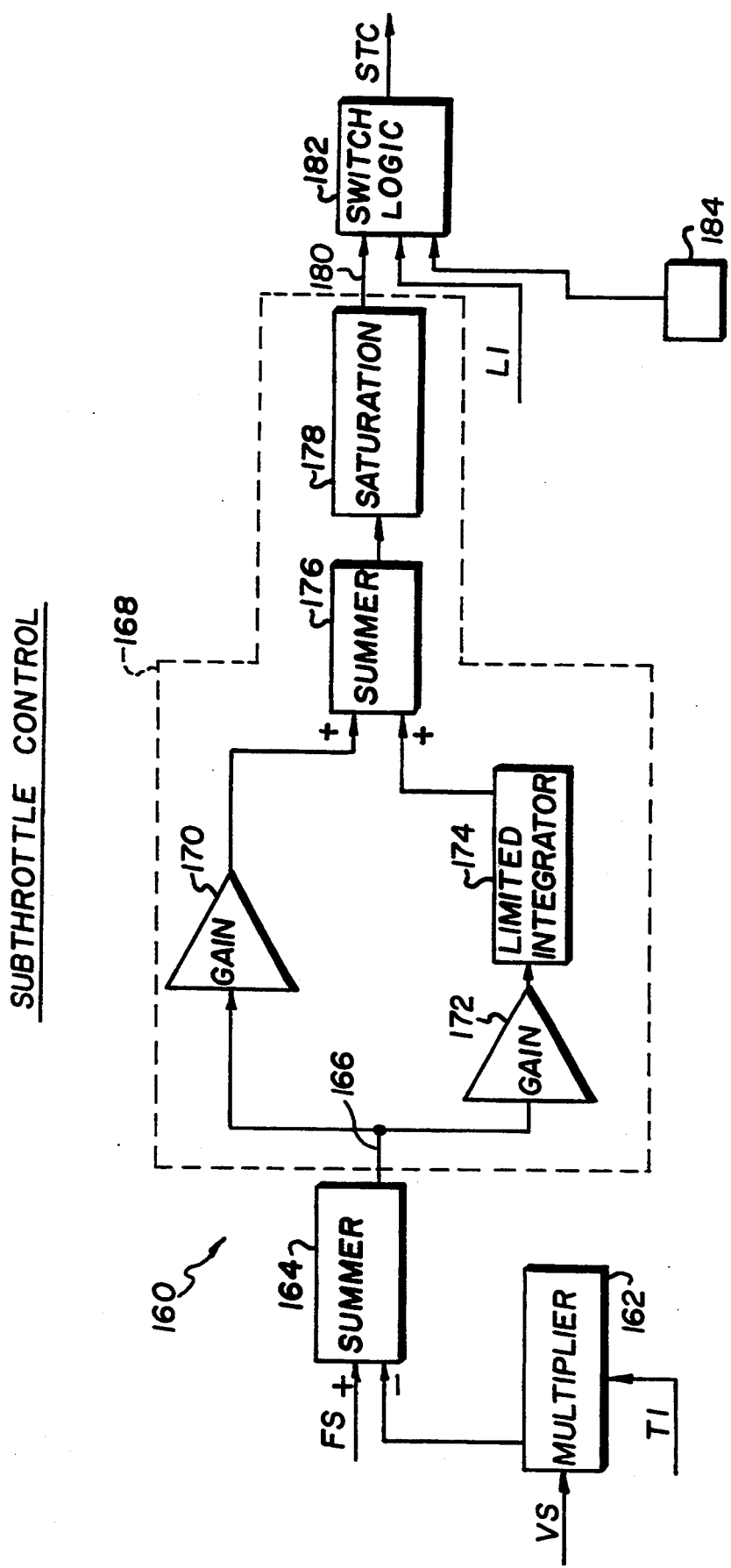
FIG. 7 is a functional schematic of a subthrottle control loop.

A subthrottle control loop 160, as depicted in FIG. 7, includes a multiplier 162 that receives the signals "VS" and "T1" and a summer 164 that receives the signal "FS" along with output from the multiplier 162. The summer 164 compares the average speed "FS" of the front drive wheels to a multiple of the vehicle speed "VS" (in common units) and outputs an error signal 166 representative of excessive wheel slip. The error signal 166 is processed by a proportional integral controller 168, which integrates the error signal 166 and scales it to the subthrottle actuator 94. The proportional integral controller 168 includes the usual features of two gain elements 170 and 172, a limited integrator 174, a summer 176, and a saturation element 178 that maintains an output signal 180 within bounds of the subthrottle actuator 94.

Switch logic 182 receives the calculated output signal 180, shut-down logic signal "L1", and a shut-down value signal 184 having a value of "100". When the logic signal "L1" indicates that the subthrottle is to be enabled, then the switch logic 182 passes the signal 180 as a subthrottle command signal "STC". However, when the subthrottle is to be disabled, the shut-down value is assigned to the subthrottle command signal "STC". For example, the subthrottle 92 is preferably positioned 100 percent open when disabled.

Figure 8:
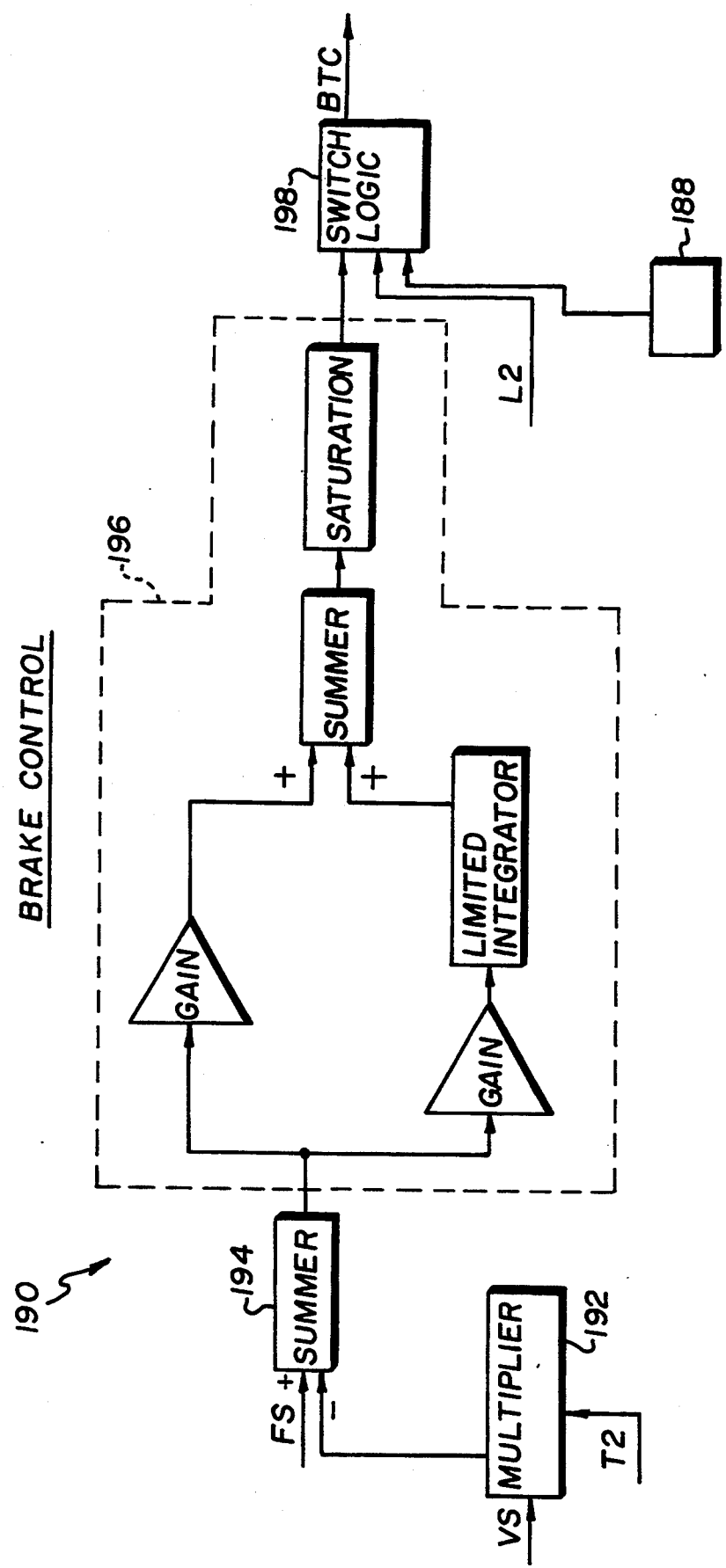
FIG. 8 is a functional schematic of a brake control loop.

A brake control loop 190 illustrated in FIG. 8 is similar to the subthrottle control loop 160. For example, the brake control loop 190 includes a multiplier 192, a summer 194, a proportional integral controller 196, and switch logic 198. However, the multiplier 192 receives threshold "T2" instead of "T1", and the switch logic 198 receives shut-down logic signal "L2" instead of "L1" and a different shut-down value signal 188 having a value of "0". Also, the proportional integral controller integrates and scales the slip signal from the summer 194 to an appropriate response of the single point brake 90.

The switching logic 198 passes the output of the proportional integral controller 196 as a brake command signal "BTC" when the signal "L2" indicates that the brake is to be enabled. However, the shut-down value is assigned to the brake command signal "BTC" when the same signal indicates that the brake is to be disabled. Preferably, the brake is completely disengaged (i.e., producing "0" friction torque) when disabled.

FIGS. 9A-9C show the effects of actuating the subthrottle 92 and the single point brake 90 at different respective thresholds "T1" and "T2". FIG. 9A plots the vehicle speed "VS", the front drive wheel average speed "FS", and the two thresholds "T1" and "T2" as products of vehicle speed "VS". FIGS. 9B and 9C share with FIG. 9A a similarly scaled abscissa in units of time, but separately plot the subthrottle command "STC" in units of throttle angle and the brake command "BTC" in units of brake torque.

At time "s1", drive wheel speed "FS" first exceeds the threshold "T1", and the subthrottle responds by beginning to close. However, starting at 100 percent throttle angle, a small amount of time is required before the subthrottle 92 actually begins to further restrict air flows by closing more than the main throttle 98, whose performance is plotted as line "MT". This delay could be avoided by linking the subthrottle 92 to the main throttle 98 so that the subthrottle 92 starts to close from a position closer to the position of the main throttle 98.

The drive wheel speed "FS" exceeds the threshold "T2" at time "s2", and the single point brake 98 is engaged. Until the wheel speed "FS" starts to decrease at time "s3", the subthrottle angle "STC" continues to decrease and the brake torque "BTC" continues to increase. Thereafter, the subthrottle angle "STC" gradually increases and the brake torque "BTC" gradually decreases. However, at time "s4", wheel speed "FS" again exceeds the threshold "T1", but the subthrottle response is sufficient to maintain the wheel speed "FS" near the target threshold "T1" without requiring further engagement of the brake 90.

Although the invention has been described in its preferred embodiment as a hybrid traction control system combining engine output limiting with a single point brake, it would also be possible to obtain significant traction benefits from the use of the single point brake alone or in combination with other traction-aiding devices. For example, a significant traction improvement could be obtained by combining the single point brake with a limited slip differential.

We claim:

1. In a hybrid traction system of a motor vehicle comprising:
   a power train originating at an engine that generates output power and extending in one direction to at least one auxiliary device that consumes a portion of the output power and in another direction to a differential that apportions the remaining output power between at least one pair of drive wheels;
   an engine output power controller that regulates generation of the output power by an engine;
   a brake that regulates transmission of the output power along said power train to said pair of drive wheels;
   a detector that detects wheel slip of at least one of said pair of drive wheels; and a control system that responds to the detection of wheel slip by engaging both said engine controller and said brake for reducing the output power transmitted to said pair of drive wheels, the improvement in which said brake is positioned along said power train between said auxiliary device and said engine for reducing the output power transmitted to the differential.

2. The system of claim 1 in which said engine includes a block and an output shaft rotatable within said block, and said brake is connected to a portion of said power train that rotates at the same speed as said engine output shaft.

3. The system of claim 2 in which said brake is positioned for producing resistance to rotation of said output shaft with respect to said block.

4. The system of claim 3 in which said power train includes a pulley coupled to said output shaft for transmitting the output power to said auxiliary device, and said brake is located between said block and said pulley.

5. The system of claim 4 in which said brake includes two relatively movable members, a first of said members being coupled to said block and a second of said members being at least indirectly coupled to said output shaft.

6. The system of claim 5 in which said second member is coupled to said pulley.

7. The system of claim 5 in which said pulley includes a hollow interior, and first and second members are enclosed within said hollow interior of the pulley.

8. The system of claim 7 in which one of said first and second members is movable against a spring force along the output shaft.

9. The system of claim 8 in which said first member includes an electromagnetic coil, and said second member includes an armature that is attracted toward said first member upon energization of said coil.

10. The system of claim 1 in which said differential is a limited slip differential for generating frictional resistance to relative rotation between said pair of drive wheels.

11. A brake mounted on an engine of a motor vehicle comprising:
an engine block;
an output shaft rotatable by power generated within said block;
a drive pulley for conveying the power to auxiliary devices;
a first member coupled to said engine block;
a second member coupled together with said drive pulley to said output shaft; and
an actuator for controlling relative movement between said first and second members for developing resistance to rotation of said output shaft with respect to said engine block.

12. The brake of claim 11 in which said pulley includes a hollow interior, and said first and second members are enclosed within said hollow interior of the pulley.

13. The brake of claim 12 in which one of said first and second members is movable along said output shaft.

14. The brake of claim 13 in which said first and second members have frictional surfaces that are engageable for developing frictional resistance to rotation of said output shaft.

15. The brake of claim 14 in which a spring opposes movement of said one member along said output shaft.

16. The brake of claim 15 in which said second member is coupled to said pulley.

17. The brake of claim 16 in which said spring couples said second member to said pulley.

18. The brake of claim 14 in which said actuator is an electromagnetic actuator.

19. The brake of claim 18 in which said first member includes an electromagnetic coil, and said second member includes an armature that is moved toward said first member upon energization of said coil.

20. The brake of claim 12 further comprising a rotatable seal located between said engine block and said drive pulley for preventing contaminants from entering said hollow interior of the pulley.

21. The brake of claim 11 in which said first member is attached directly to said engine block to promote heat exchange between said first member and said block.

22. A traction system of a motor vehicle comprising:
an engine that generates output power having an output shaft rotatable within an engine block;
a drive train connected to said output shaft for transmitting the output power to a pair of drive wheels;
a drive pulley coupled to said output shaft;
a brake located between said engine block and said pulley;
a detector that detects wheel slip of at least one of the pair of drive wheels; and
a control system that responds to the detection of excessive wheel slip by engaging said brake for reducing the output power transmitted to the pair of drive wheels.

23. The system of claim 22 in which said drive pulley includes a hollow interior, and at least a portion of said brake is enclosed within said hollow interior of the pulley.

24. The system of claim 23 in which said brake includes a first member coupled to said engine block and a second member at least indirectly coupled to said output shaft.

25. The system of claim 24 in which said first and second members have frictional surfaces that are engageable for developing frictional resistance to rotation of said output shaft with respect to said block.

26. The system of claim 25 in which one of said members is relatively movable for engaging said frictional surfaces.

27. The system of claim 25 in which said second member is formed by said interior of the pulley.

28. The system of claim 26 in which said second member is connected to said pulley with a spring.

* * * * *